(12) United States Patent
Ichiyama

(10) Patent No.: US 6,361,214 B1
(45) Date of Patent: Mar. 26, 2002

(54) HYDRODYNAMIC-PRESSURE BEARING DEVICE AND MOTOR PROVIDED WITH THE HYDRODYNAMIC-PRESSURE BEARING DEVICE

(75) Inventor: Yoshikazu Ichiyama, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 09/628,018

(22) Filed: Jul. 28, 2000

(30) Foreign Application Priority Data

Aug. 2, 1999 (JP) .......................................... 11-219270
Sep. 6, 1999 (JP) .......................................... 11-251495
Mar. 27, 2000 (JP) ...................................... 2000-086041

(51) Int. Cl.$^7$ ........................... H02K 7/00; F16C 17/00; F16C 33/00
(52) U.S. Cl. ......................... 384/107; 384/114; 384/115
(58) Field of Search ............................... 384/100, 101, 384/102, 103, 104, 105, 106, 107, 108, 109, 110, 111, 112, 113, 114, 115, 116, 117, 118, 119, 120, 121, 122, 123, 124, 125

(56) References Cited

U.S. PATENT DOCUMENTS

| | | | |
|---|---|---|---|
| 4,557,610 A | | 12/1985 | Asada et al. |
| 4,856,918 A | * | 8/1989 | Inoue et al. ............. 384/108 X |
| 5,516,212 A | * | 5/1996 | Titcomb .................... 384/107 |
| 5,524,986 A | * | 6/1996 | Leuthold et al. ............ 384/119 |
| 5,822,846 A | | 10/1998 | Moritan et al. |
| 6,034,454 A | * | 3/2000 | Ichiyama .................... 384/121 |
| 6,036,369 A | * | 3/2000 | Ichiyama .................... 384/119 |
| 6,059,459 A | * | 5/2000 | Ichiyama .................... 384/112 |
| 6,066,903 A | * | 5/2000 | Ichiyama ................. 384/120 X |
| 6,126,320 A | * | 10/2000 | Ichiyama .................... 384/112 |
| 6,154,339 A | * | 11/2000 | Grantz et al. ........... 384/110 X |
| 6,196,722 B1 | * | 3/2001 | Asada et al. ............ 384/107 X |
| 6,246,136 B1 | * | 6/2001 | Ichiyama ................ 384/107 X |
| 6,296,391 B1 | * | 10/2001 | Hayakawa et al. ......... 384/119 |
| 6,307,293 B1 | * | 10/2001 | Ichiyama ................ 384/123 X |

FOREIGN PATENT DOCUMENTS

| JP | 58-50318 | * | 3/1983 |
|---|---|---|---|
| JP | 63-34317 | * | 2/1988 |

* cited by examiner

Primary Examiner—David Fenstermacher
Assistant Examiner—Colby Hansen
(74) Attorney, Agent, or Firm—James Judge

(57) ABSTRACT

Spindle motor hydrodynamic pressure bearing device having upper and lower radial bearing portions axially separated by an air space, established in the micro-gap between the outer circumferential surface of the motor shaft and the inner circumferential surface of the motor sleeve element, and upper and lower thrust bearing portions established on either side of a thrust plate flange at the lower end of the shaft. A micro-gap established between the thrust plate and an opposing base surface of a recess in the sleeve element accommodating the thrust plate is continuous with the lower radial bearing micro-gap. Lubricating oil in the micro-gaps is therein retained continuously between the lower radial bearing and the upper thrust bearing. The lower radial bearing generates hydrodynamic pressure acting axially outward (toward the upper thrust bearing), and the upper thrust bearing generates hydrodynamic pressure acting radially inward (toward the lower radial bearing). Consequently, a high hydrodynamic pressure area develops in the vicinity of boundary between the lower radial and upper thrust bearings, which by cooperation of the bearings generates supporting force bearing axial and radial loads. The air space and radial outward portion of the thrust bearings communicate with the atmosphere through breathing holes (or channels) formed in the sleeve.

13 Claims, 10 Drawing Sheets

HYDRODYNAMIC-PRESSURE BEARING DEVICE AND MOTOR PROVIDED WITH THE HYDRODYNAMIC-PRESSURE BEARING DEVICE

BACKGROUND OF THE INVENTION

1. Technical Field

The present invention relates to hydrodynamic-pressure bearing devices employed in motors; in particular, to hydrodynamic-pressure bearing devices in which a shaft made with a thrust plate projecting radially outward with respect to the rotational axis, and a sleeve element surrounding the shaft rotate relative to one another via a lubricant—and to motors provided with the hydrodynamic-pressure bearing devices.

2. Description of Related Art

Hydrodynamic pressure bearings are employed a s bearing devices in such motors as hard-disk drive spindle motors in order to improve motor running characteristics and to achieve higher speed rotation an d low vibration (noise). FIG. 1 is a sectional view in which a hard-disk drive spindle motor equipped with a conventional hydrodynamic-pressure bearing device is illustrated.

The bearing device in FIG. 1 has: a shaft a having a thrust plate b at the lower end; a cylindrical sleeve member d in which a center hole or bore c is provided, with the bore wall surrounding the outer circumferential surface of the shaft a via a micro-gap; and an annular thrust groove e formed in the lower end of the sleeve d for accommodating the thrust plate b. The opening on the thrust-plate side end of the center hole c in the sleeve member d is covered by a cover member f.

Upper and lower radial bearing portions g and h in which lubricating oil is retained and having herringbone striations for generating hydrodynamic pressure are defined between the sleeve member d and the shaft a. A radial gap expansion i provided in between the upper and lower radial bearing portions g and h. The radial gap expansion i communicates with the exterior (the exterior of the sleeve member d within the spindle motor) via a vent hole j provided in the sleeve member d, which opens to the external atmosphere via a gap m formed between a rotor k and a bracket l.

Further, the radial gap expansion i communicates with a recess p formed in the lower end of the shaft a via a radial vent hole n and an axial vent hole o provided in the shaft a. An axial breathing hole q is provided in between the thrust plate b and the shaft a, and in the thrust plate b a breathing hole r that communicates an axially intermediate position of the breathing hole q with the outer circumferential surface of the thrust plate b is provided.

A pair of thrust bearing portions s in which lubricating oil is retained and having herringbone striations for generating hydrodynamic pressure are defined between the upper and lower faces of the thrust plate b, and the lower face of the thrust groove e and the upper face of the cover f.

Air bubbles mixed in the lubricating oil retained in the upper radial bearing portion g are, in the upper section thereof, released to the exterior from between the upper end of the sleeve member d and the shaft a, and respectively in the lower section thereof, released via the gap expansion i and the vent hole j. Air bubbles mixed in the lubricating oil retained in the lower radial bearing portion h are, in the upper section thereof, released to the exterior via the gap expansion i and the vent hole j, and respectively in the lower section thereof, released via the breathing hole q, the recess p, the axial vent hole o, the radial vent hole n, the gap expansion i and the vent hole j. Air bubbles mixed into the lubricating oil retained in the thrust bearing portions s are also released to the exterior via the breathing hole q, the recess p, the axial vent hole o, the radial vent hole n, the gap expansion i and the vent hole j. Accordingly, either axial end sections of the radial bearing portions and either radial end sections of the thrust bearing portions—i.e., the sections in which the pressure due to the striations in each of the bearing portions is lowest—are respectively vented to the external atmosphere;

and releasing air bubbles mixed within the lubricating oil in these sections to the exterior. By virtue of the above-described structure, lubricating oil is prevented from overflowing/dispersing, due to temperature elevation and air-bubble expansion when the atmospheric pressure declines, to the exterior of the bearing device.

In hard-disk drive spindle motors, female threads t for fixing a disk clamp (not shown) are provided in the shaft a for clamping hard disk(s) on the motor with a screw (not shown), but in making the motors thinner, female threads t vie with the axial vent hole o, and the radial vent hole n, etc. for space within the shaft a, lowering the degree of freedom from a design aspect, and in some respects leading to difficulties in the manufacturing process. Moreover, conventional spindle motors make numerous vent holes and breathing holes as in the foregoing necessary, which has become a production cost-increase factor. In particular, the necessity of providing the breathing hole q and the breathing hole r as noted above in the thrust plate b makes costs high, and makes it difficult to form the shaft a and the thrust plate b integrally.

SUMMARY OF THE INVENTION

An object of the present invention is to provide a hydrodynamic-pressure bearing device manufacturable at low cost.

Another object of the invention is to provide a hydrodynamic-pressure bearing device in which air bubbles intermixed into the lubricant can be exhausted to the exterior of the bearing.

Yet a further object of the present invention is to provide a hydrodynamic-pressure bearing device of simple construction in which air bubbles intermixed into the lubricant can be exhausted to the exterior of the bearing, and that at the same time is manufacturable at low cost.

An another object of the invention is to provide a motor equipped with a hydrodynamic-pressure bearing device of simple construction in which air bubbles intermixed into the lubricant can be exhausted to the exterior of the bearing, and that at the same time is manufacturable at low cost.

A hydrodynamic-pressure bearing device of the present invention includes a shaft, a thrust plate projecting radially outward from the circumferential surface of the shaft, and a cylindrical sleeve element surrounding the shaft and thrust plate via a micro-gap. On the surfaces where the shaft and the sleeve element face each other radially, a pair of radial bearing portions that retain lubricant are configured so as to be axially separated from each other; and on the surfaces where the thrust plate and the sleeve element face each other axially, thrust bearing portions that retain lubricant are configured. One or the other of the pair of radial bearing portions retains lubricant continuously with the thrust bearing portions, in which radial bearing portion axially asymmetrical herringbone striations that generate hydrodynamic pressure acting toward the thrust bearing portion are formed as dynamic-pressure-generating grooves. Spiral striations that generate hydrodynamic pressure that acts heading radially inward are formed as dynamic-pressure-generating grooves in the thrust bearing portions. Lubricant is sustained on the outer periphery of the thrust plate, continuous with the thrust bearing portions. An annular recess is formed in between the pair of radial bearing portions so as to enlarge the radial dimension of the micro-gap, which is defined by the space between the outer circumferential surface of the shaft and the inner circumferential surface of the sleeve element by which it is radially opposed; air is retained in the annular recess, which separates the pair of radial bearing portions. A breathing hole that opens on the annular recess and the outer periphery of the thrust plate, and at the same time opens on the exterior of the bearing, is formed in the sleeve element. Air bubbles intermixed into the lubricant retained in the pair of radial bearing portions and the thrust bearing portions are exhausted or released to the exterior of the bearing through the breathing hole.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

Embodiments of the present invention are explained below with reference to FIGS. 2 through 14. It should be understood that the motors and hydrodynamic-pressure bearing devices illustrated in each of the drawings indicate examples in which the present invention is applied to a hard-disk drive spindle motor.

FIGS. 2 through 5 show a motor and hydrodynamic-pressure bearing device in a first embodiment of the present invention.

Figure 2:
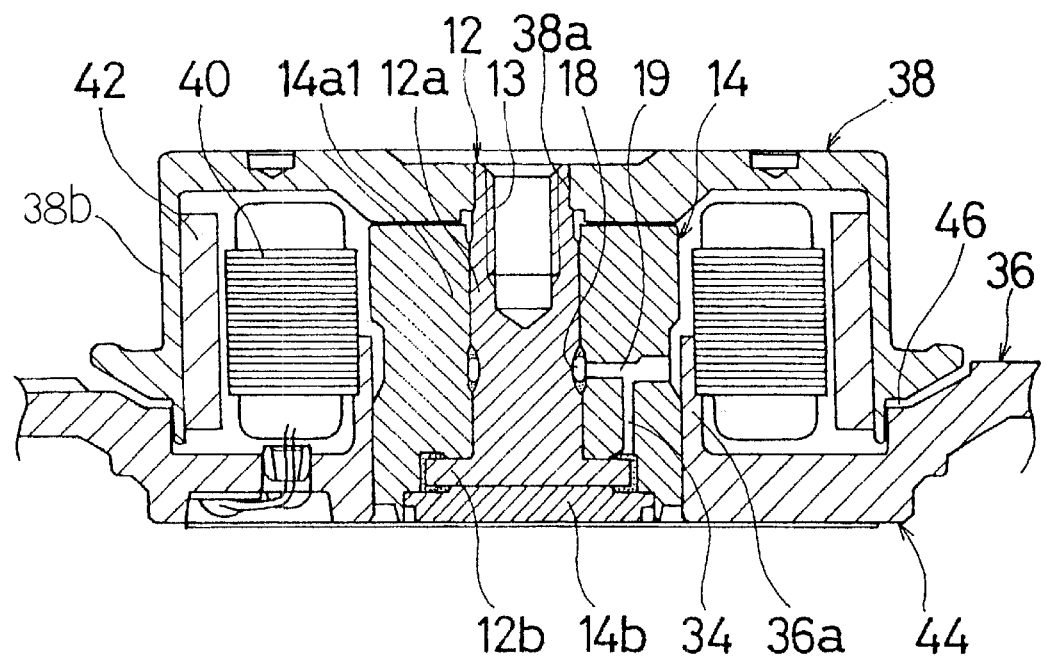
FIG. 2 is a sectional view showing a first embodiment of a motor of the present invention.
Figures 3A, 3B:
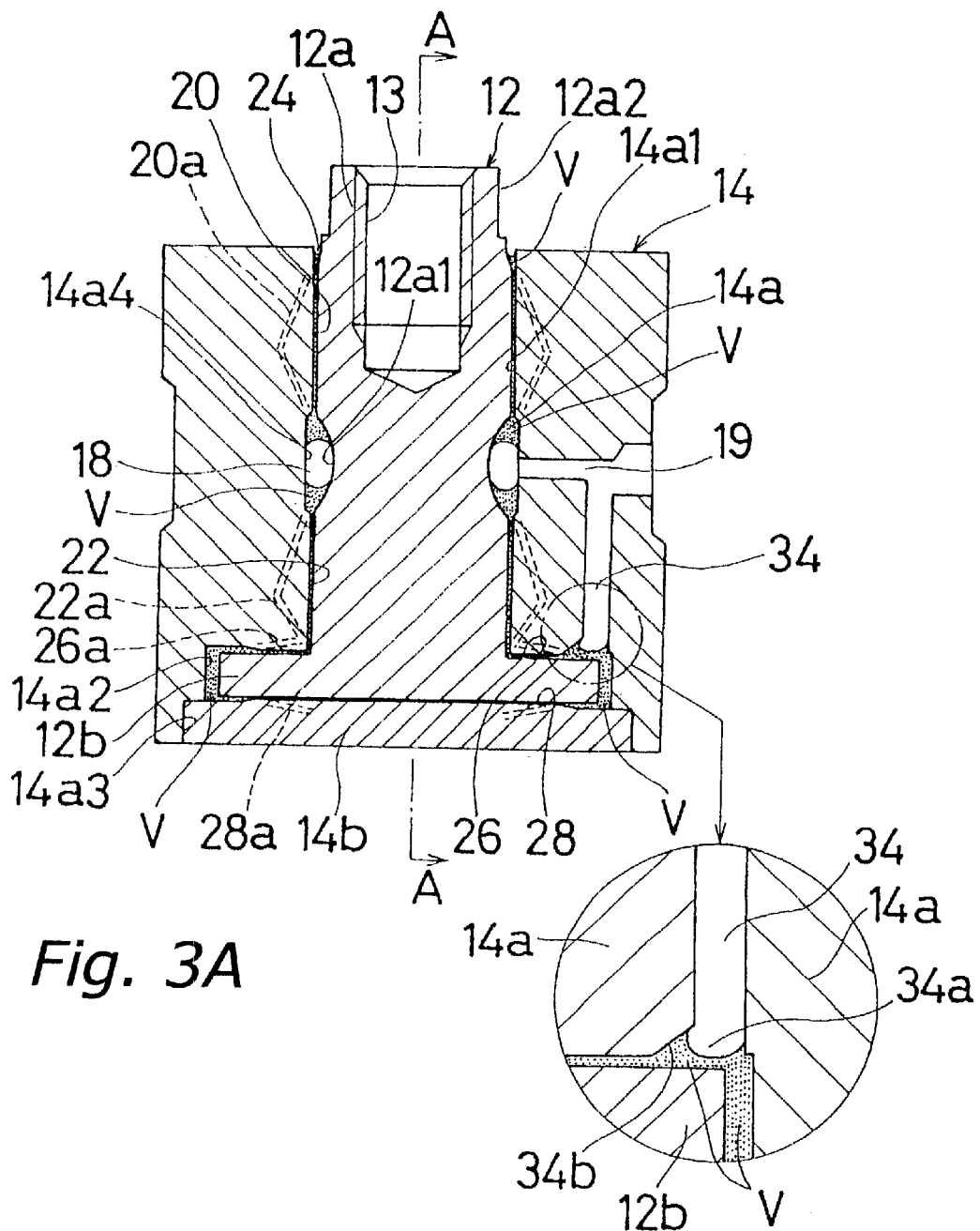
FIG. 3A is a sectional view exemplarily showing a hydrodynamic-pressure bearing device from the motor shown in FIG. 2.
FIG. 3B is a partial enlarged sectional view magnified to show a thrust-plate end opening of a breathing hole in the hydrodynamic-pressure bearing device shown in FIG. 2.

Rotary shaft member 12 in FIGS. 2 and 3 is formed unitarily by shaft 12a and annular plate-shaped, coaxially protruding thrust plate 12b on the lower end of the shaft 12a. An annular recess 12a1 (FIG. 3), arcuate in section, is formed in an axially intermediate portion of the outer circumferential surface of the shaft 12a. The upper end of the shaft 12a is formed into a taper such that the outer diameter of the shaft 12a reduces gradually heading upward; and a smaller outer diameter portion 12a2 is formed continuous with the section formed into the taper. The smaller outer diameter portion 12a2 of the shaft 12a is fixed into a mounting hole 38a in cup-shaped rotor hub 38. Rotor magnet 42 is fitted to the inner peripheral face of an outer circumferential wall 38b of the rotor hub 38.

A female-threaded hole 13 that opens upward is provided in the shaft 12a axially, and a clamp element (not shown), that retains a hard disk (also not shown) mounted onto the outer peripheral face of the outer circumferential wall 38b of the rotor hub 38, is screwed down by means of a male screw (again, not shown) fitted into the female-threaded hole 13.

The rotary shaft member 12 is accommodated within a stationary sleeve 14. The sleeve 14 is formed axially penetrated by a center hole 14a consisting of: a small-inner-diameter section 14a1 that opposes the outer circumferential surface of the shaft 12a of the shaft member 12 via a micro-gap; a medium-inner-diameter section 14a2 that continues beneath the small-inner-diameter section 14a1 and meanwhile accepts the thrust plate 12b in a path enlarging radially outward by a step that in cooperation with a thrust cover 14b configures a later-described top thrust bearing portion; and a large-inner-diameter section 14a3 that enlarges in a path further radially outward than the medium inner-diameter section 14a2. A lower side opening of the center hole 14a is covered by the thrust cover 14b that is fixedly fitted into the large-inner-diameter section 14a2 and that configures a later-described bottom thrust bearing portion in cooperation with the bottom face of the thrust plate 12b. An upper side opening of the center hole 14a is opened to the external atmosphere in a tapered portion 24 defined between the tapered face of the shaft 12a and the radially opposing inner circumferential face of the small-inner-diameter section 14a1. Further, the outer periphery of the sleeve 14 is fitted into an annular cylindrical wall 36a furnished on a bracket 36. A stator 40 that radially opposes the rotor magnet 42 is attached to the outer periphery of the annular wall 36a.

An annular channel 14a4 that in cross-sectional form is flat-bottomed, and that radially opposes the annular recess 12a1 formed on the outer circumferential surface of the shaft 12a, is formed on an axially middle part of the inner circumferential surface of the small-inner-diameter section 14a1 of the center hole 14a; and a radial gap expansion 18 is defined in between the annular recess 12a1 and the annular channel 14a4. An intermediate vent hole 19 that opens on the annular channel 14a4 and the outer circumferential surface of the sleeve 14 and opens the radial gap expansion 18 to the exterior of the bearing is provided in the sleeve 14. Air taken in through the intermediate vent hole 19 is sustained in the radial gap expansion 18.

Figure 4:
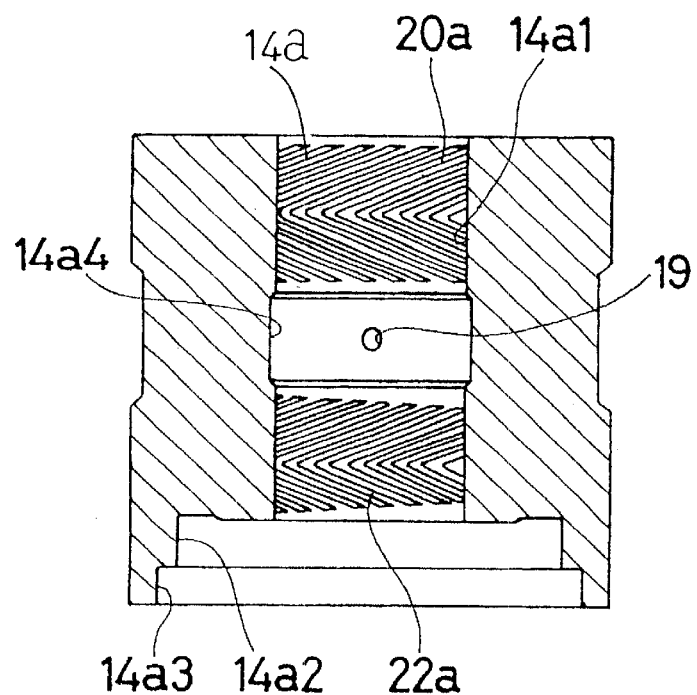
FIG. 4 is a sectional view taken along the line A—A through a sleeve element of the hydrodynamic-pressure bearing device shown in FIG. 3A.
Figure 5:
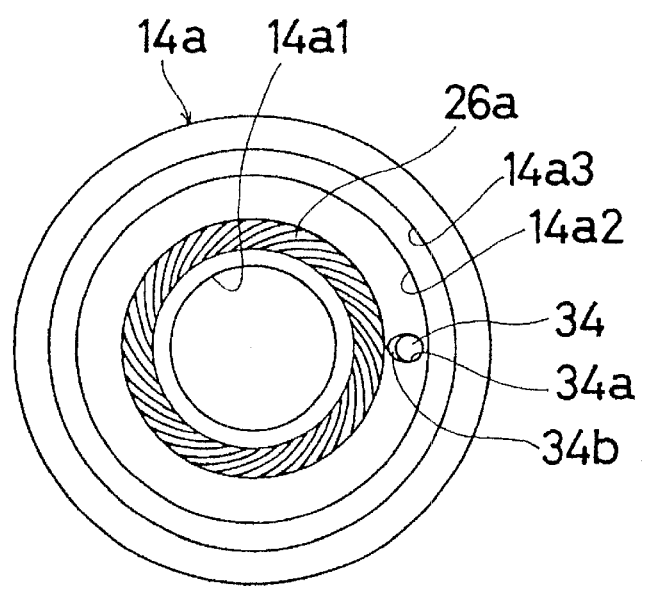
FIG. 5 is a bottom-face view of the sleeve element of the FIG. 1 motor.
Figure 6:
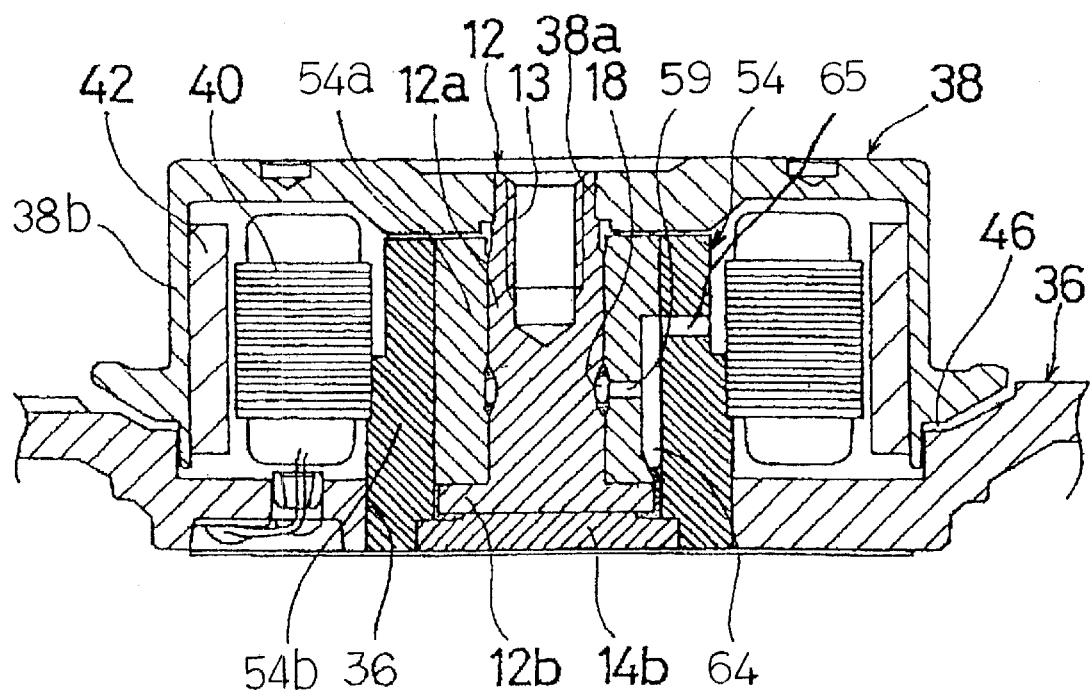
FIG. 6 is a sectional view showing a second embodiment of a motor of the present invention.
Figure 7:
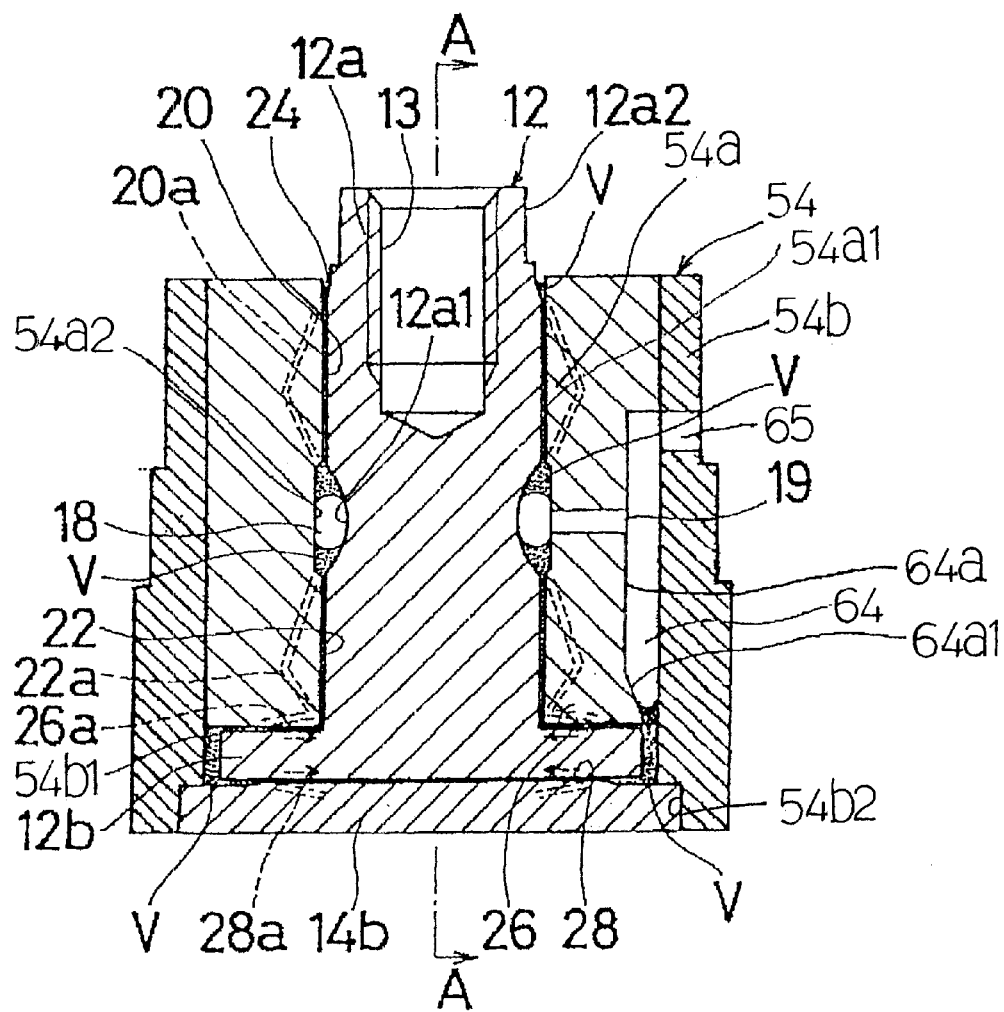
FIG. 7 is a sectional view exemplarily showing a hydrodynamic-pressure bearing device from the motor shown in FIG. 6.
Figure 8:
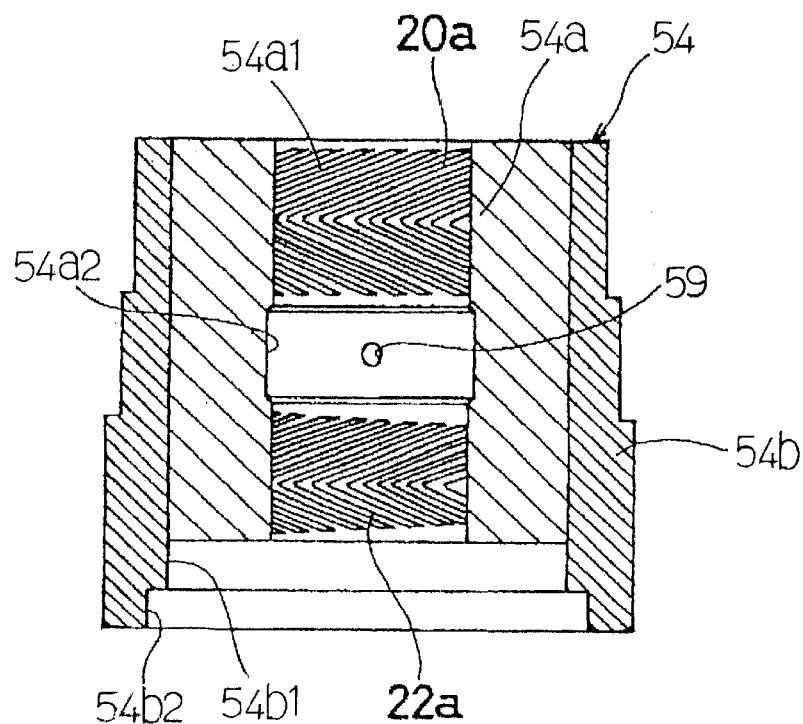
FIG. 8 is a sectional view taken along the line A—A through a sleeve element of the hydrodynamic-pressure bearing device shown in FIG. 7.
Figure 9:
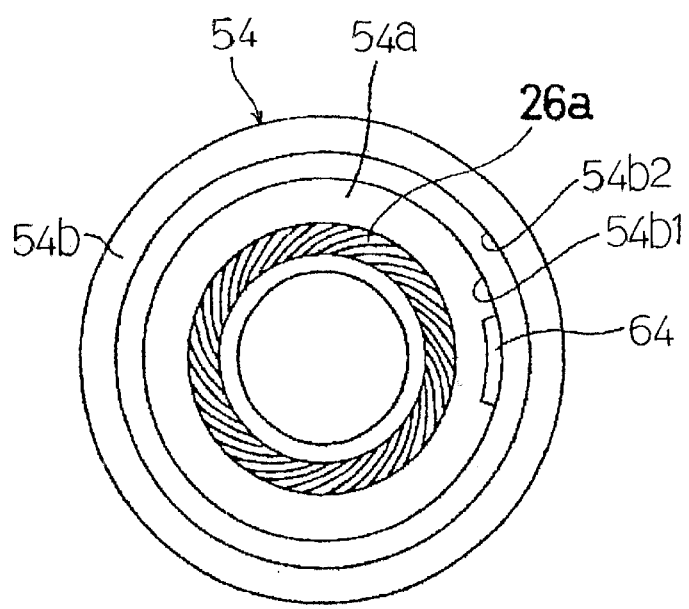
FIG. 9 is a bottom-face view of the sleeve element of the FIG. 6 motor.

Lubricant V is retained between the outer circumferential surface of the shaft 12a and the inner circumferential surface of the small-inner-diameter section 14a1 of the center hole 14a, at the top and bottom axially of the radial gap expansion 18, where a top radial bearing portion 20 and a bottom radial bearing portion 22 are respectively configured. As shown in FIG. 4, herringbone striations 20a, axially symmetrical in form such that the mid position (position of the crooks in the striations) is located in an axially intermediate position in the top radial bearing portion 20, are provided in the part of the inner circumferential surface of the small-inner-diameter section 14a1 that between the outer circumferential surface of the shaft 12a defines the top radial bearing portion 20. When the by which the top thrust bearing portion 26 is configured dynamic pressure that acts on the lubricant V retained in the top radial bearing portion 20, directed from the herringbone striations 20a on either end (top and bottom sides axially) toward the crooks in the striations, is generated by the herringbone striations 20a. In other words, the top radial bearing portion 20 is configured so that peak hydrodynamic pressure is generated in an axially intermediate position in the top radial bearing portion 20, and so that the pressure is lowest in either end. Further, herringbone striations 22a, axially asymmetrical in shape, formed such that the mid position (position of the crooks in the striations) is located in a position downwardly offset in the bottom radial bearing portion 22, are provided in the part of the inner circumferential surface of the small-inner-diameter section 14a1 that between the outer circumferential surface of the shaft 12a defines the bottom radial bearing portion 22. When the rotary shaft member 12 rotates, dynamic pressure that acts on the lubricant V retained in the bottom radial bearing portion 22, directed from the herringbone striations 22a on either end (top and bottom sides) toward the crooks in the striations, is generated by the herringbone striations 22a. That is, the bottom radial bearing portion 22 is configured so that peak hydrodynamic pressure is generated in the vicinity of the axially lower end, and so that the pressure lowest in the upper end.

The tapered portion 24, defined between the taper into which the outer circumferential surface of the shaft 12a is formed and the small-inner-diameter section 14a1, is located in the upper end of the top radial bearing portion 20, and the radial dimension of the gap between the inner circumferential face of the small-inner-diameter section 14a1 and the outer circumferential face of the shaft 12a gradually enlarges as it goes axially upwards. The annular recess arcuate in cross-sectional shape that is formed in the outer circumferential surface of the shaft 12a is situated at the lower end of the top radial bearing portion 20, and the clearance dimension of the radial gap expansion 18 defined between the annular recess 12a1 and the annular channel 14a4 gradually reduces heading axially upwards/downwards from the portion opening on the intermediate vent hole 19 in the small-inner-diameter section 14a1. The boundary surface between the lubricant V retained in the top radial bearing portion 20 and the external atmosphere positions at the location in which the pressure of surface tensions from the external atmosphere acting on the lubricant V within the tapered portion 24 and the radial gap expansion 18, respectively, are balanced.

Decrease in the lubricant V retained in the top radial bearing portion 20 from use over the long term acts to make the pressure due to air surface tension acting on the boundary surface between the lubricant V and the air on the tapered portion 24 side, and the boundary surface between the lubricant V and the air on the radial gap expansion 18 side, equal, and these boundary surfaces with the lubricant V respectively shift toward the top radial bearing portion 20. Consequently, lubricant V that had been retained within the tapered portion 24 and the radial gap expansion 18, is replenished to the top radial bearing portion 20.

The radial gap expansion 18 is positioned at the upper end of the bottom radial portion 22, and the upper-end boundary surface of the lubricant V retained in the bottom radial bearing portion 22 is positioned at the lower part of the opening on the intermediate vent hole 19 within the radial gap expansion 18.

The base of the step in which the small-inner-diameter section 14a1 and the medium-inner-diameter section 14a2 in the sleeve 14 join is formed so as to be a flat surface, parallel to the axially opposing upper face of the thrust plate 12b, from the inner edge of the step to near the mid section radially. After forming an inclined surface that is continuous with the flat surface and inclines heading upwards, the base of the step is formed so as to be a radially outward flat surface parallel to its radially inward flat surface that reaches to the medium-inner-diameter section 14a2. That is, the axial gap defined in between the upper face of the thrust plate 12b and the bottom face of the step in the sleeve 14 is established so as to make the clearance dimension narrower in the region on the inner peripheral side of the lower face of the step than the region on the outer peripheral side. Further, the upper face of the thrust cover 14b is formed so as to be a flat surface, parallel to the axially opposing lower face of the thrust plate 12b and the lower-end face of the shaft 12a, from a position opposite the axial center of the shaft 12a to near the radially mid section of the thrust plate 12b. After forming an inclined surface that is continuous with the flat surface and inclines heading downwards, the upper face of the thrust cover 14b is formed so as to be a radially outward flat surface parallel to its radially inward flat surface until the medium-inner-diameter section 14a2. In other words, the axial gap defined in between the lower face of the thrust plate 12b and the lower-end face of the shaft 12a, and the thrust cover 14b is established so as to make the clearance dimension narrower in the region on the inner peripheral side, in from the radially mid section of the thrust plate 12b, than the region on the outer peripheral side. Moreover, in between the outer circumferential surface of the thrust plate 12b and the inner circumferential surface of the medium-inner-diameter section 14a2 by which it is radially opposed, a gap that connects the axial gaps between the upper and lower faces of the thrust plate 12b, and the lower face of the step in the sleeve 14 as well as the upper face of the thrust cover 14b, is defined having a radial clearance dimension wider than the axial clearance dimension of these axial gaps, and lubricant V that is continuous with the lubricant V that is retained in the bottom radial bearing portion 22 is retained in each of the gaps.

Pump-in type spiral striations 26a as shown in FIG. 5A, by which the top thrust bearing portion 26 is configured, are formed as dynamic-pressure-generating grooves on the flat surface of the bottom surface of the step that defines an axial gap between it and the upper face of the thrust plate 12b narrower than on the radially outer peripheral side. Further, pump-in type spiral striations 28a in form likewise as with the top thrust bearing portion 26, and by which the bottom thrust bearing portion 28 is configured are formed as dynamic-pressure-generating grooves on the flat surface of the upper surface of the thrust cover 14b that defines an axial gap between it and the lower face of the thrust plate 12b narrower than on the radially outer peripheral side. When the rotary shaft member 12 rotates, dynamic pressure is generated acting to raise the pressure heading radially inward in the lubricant V retained in the top and bottom thrust bearing portions 26 and 28 by the spiral striations 26a and 28a.

Dynamic pressure that acts radially inward in the lubricant V retained in the top thrust bearing portion 26 is generated by the spiral striations 26a when the rotary shaft member 12 rotates, but because the shaft 12a is positioned in the rotational axis of the thrust plate 12b, radially inward action in the lubricant V by the spiral striations 26a is obstructed by the shaft 12a. Nevertheless, axially asymmetrical herringbone striations 22a are formed on the bottom radial bearing portion 22 adjacent the top thrust bearing portion 26 so that in the vicinity of the axially lower end a pressure peak develops, and at the same time since lubricant V is retained continuously in between the bottom radial bearing portion 22 and the top thrust bearing portion 26, in the vicinity of the border between these bottom radial bearing and top thrust bearing portions 22 and 26 a pressure peak in the dynamic pressure acting in the lubricant V develops. Consequently, the bottom radial bearing portion 22 and the top thrust bearing portion 26 cooperate to generate the necessary dynamic pressure for supporting the rotary shaft member 12. Also, in the bottom thrust bearing portion 28 a pressure peak in the dynamic pressure acting in the lubricant V in the vicinity of the rotational center of the shaft 12a develops by the action radially inward on the lubricant V due to the spiral striations 28a.

The dynamic-pressure generating grooves formed in the top and bottom thrust bearing portions 26 and 28 are the spiral striations 26a and 28a, which lessens the resistance caused by the viscosity of the lubricant V. Meanwhile, because the thrust plate 12b can be made diametrically smaller compared to the case in which the dynamic-pressure generating grooves in the thrust bearing portions are herringbone striations, losses (increase in rotational load) arising during rotation of the rotary shaft member 12 are held down, which lessens electric power consumption of the motor.

A breathing hole 34 one end of which opens on the flat surface of the outer peripheral margin of the lower face of the step in the sleeve 14—in a position in the outer peripheral margin of the thrust bearing portion 26—and the other end of which is extended axially so as to open on the intermediate vent hole 19, is provided in the sleeve 14. A beveled face 34b is provided in an aperture 34a of the breathing hole 34 at the top thrust bearing portion 26 outer peripheral margin, as shown magnified in FIG. 5(a), which enlarges the diameter of the aperture 34a heading radially inward (toward the top thrust bearing portion 26). That is, the aperture 34a at the margin of the top thrust bearing portion 26 on the breathing hole 34 is, as is shown in FIG. 5(a), elliptical in form. Accordingly, because the aperture 34a at the margin of the top thrust bearing portion 26 on the breathing hole 34 is elliptical due to the beveled face 34b, the surface tension of the lubricant V retained between the bottom radial bearing portion 22 as well as the thrust plate 12b, and the sleeve 14, and the surface tension of the air taken in through the breathing hole 34, balance to form and retain a boundary surface between the lubricant V and the air.

When lubricant V retained in either the bottom radial bearing portion 22 or the top and bottom thrust bearing portions 26 and 28 decreases due to long-term use, pressure due to the surface tension of the air acting on the boundary between the lubricant V on the radial gap expansion 18 side of the bottom radial bearing portion 22, in which the lubricant V is retained continuously with lubricant V that is retained in the top thrust bearing portion 26, and the air, and the boundary between the lubricant V retained around the thrust plate 12b located at the aperture of the breathing hole 34 and the air, act to equalize, shifting the lubricant V toward the bottom radial bearing portion 22 and toward the thrust plate 12b respectively. Consequently, lubricant V retained in the lower part of the opening of the intermediate vent hole 19 in the radial gap expansion 18 and the aperture 34a is appropriately replenished to the bearing portions.

The action of the herringbone striations 20a formed balanced in the axial direction generates a pressure peak in the dynamic pressure near the central portion of the herringbone striations 20a (the crooks in the striations) when the rotary shaft member 12 rotates, and as the pressure heading in the axially outward direction (toward either end of the striations) declines, air bubbles mixed into lubricant V retained in the top radial bearing portion 20 therefore migrate sequentially toward the lowest-pressure tapered portion 24 and radial gap expansion 18 and exhausted or released to the exterior of the bearing, passing the boundary between the lubricant V and the air. Between the top thrust bearing portion 26 and the bottom radial bearing portion 22 continuously with which lubricant V is retained, the action of the axially asymmetrical herringbone striations 22a formed in the bottom radial bearing portion and the pump-in type spiral striations formed in the top thrust bearing portion 26 generates a pressure peak in the vicinity of the border between the two bearing portions, and as the pressure heading toward the radial gap expansion 18 and the breathing hole 34 declines, the air bubbles therefore migrate toward the lowest-pressure radial gap expansion 18 and the breathing hole 34 and exhausted to the exterior of the bearing, passing the boundary between the lubricant V and the air.

A pressure peak develops in the lower end of the shaft 12a near the rotational center by the action of the pump-in type spiral striations 28a formed in the bottom thrust bearing portion 28, and air bubbles mixed into lubricant V retained in the bottom thrust bearing portion 28 migrate toward the low-pressure outer peripheral margin of the thrust plate 12b, and after having passed the gap between the outer circumferential surface of the thrust plate 12b—where the pressure of the lubricant V is also low—and the inner circumferential surface of the middle-inner-diameter section 14a2, the clearance dimension of which is larger than the axial gap between the bottom face of the thrust plate 12b and the top face of the thrust cover 14b, the air bubbles are exhausted to the exterior of the bearing from the boundary between the lubricant V located at the aperture 34a in the breathing hole 34, and the air.

Air bubbles exhausted from the tapered portion 24 side, after having passed the space in which the stator 40 and the rotor magnet 42 are accommodated, exhaust to the exterior of the motor through the gap between the rotor hub 38 and the bracket 36. Further, air bubbles exhausted from the radial gap expansion 18 and the breathing hole 34 side, after having passed intermediate vent hole 19, and the space in which the stator 40 and the rotor magnet 42 are accommodated, exhaust to the exterior of the motor through the gap between the rotor hub 38 and the bracket 36.

Figure 1:
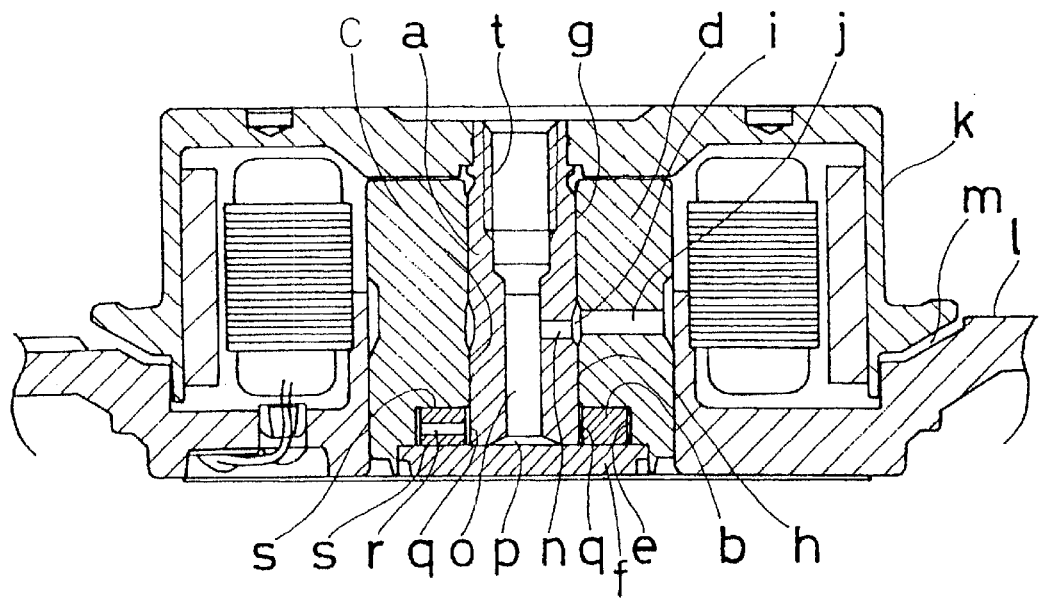
FIG. 1 is a sectional view showing a conventional motor.

The radial gap expansion 18 in which one of the boundary surfaces in the lubricant V retained in the top and bottom radial bearing portions 20 and 22 is located, and the lubricant V retained around the thrust plate 12b, are opened to the exterior of the bearing only through the intermediate vent hole 19 and the breathing hole 34 provided in the sleeve 14. Therefore, numerous breathing holes as in the conventional motor shown in FIG. 1 are unnecessary, which simplifies the configuration of the bearing portions. At the same time, manufacturing is also simplified, which contributes to motor cost reduction.

Next a second embodiment of the present invention will be explained with reference to FIGS. 6–10. It should be understood that in the following, which explains the motor and hydrodynamic pressure bearing device of the second embodiment, like marks refer to that which is identical with or equivalent to the above-described first embodiment, and their explanation is omitted.

In the second embodiment of the present invention, a sleeve 54 that accommodates the rotary shaft member 12 is formed with a through-hole 54a1 defined by the inner circumferential surface that radially opposes the outer circumferential surface of the shaft 12a via a gap, and meanwhile the lower end face is configured from two elements: a cylindrical inside sleeve 54a that axially opposes the top face of the thrust plate 12b via a gap, and a hollow cylindrical outside sleeve 54b into an inner circumferential surface 54b1 of which the outer circumferential face of the inside sleeve 54a is fixedly fitted. The inner circumferential surface 54b1 of the outside sleeve 54b radially opposes the outer circumferential surface of the thrust plate 12b via a gap. Further, an annular notch 54b2 is formed on the lower end of the outside sleeve 54b, and the thrust cover 14b is fitted into the notch 54b2.

The inside sleeve 54a—which may possibly contact the rotary shaft member 12 when the motor rotates at low speed (accelerating/decelerating), generating insufficient pressure in the hydrodynamic-pressure bearing portions 20, 22, 26 and 28—is formed from a material such as ceramic superior in anti-wear properties. Also, the outside sleeve 54b is formed from a material such as stainless steel superior in workability. Accordingly, the endurance or durability of the hydrodynamic-pressure bearing device improves broadly. It should be understood that attachment of the inside sleeve 54a opposing the inner circumferential surface 54b1 of the outside sleeve 54b may be carried out by press-fitting, shrink-fitting, ultrasonic joining, or adhesives. In order to prevent the lubricant V from leaking out from the joint between the inside sleeve 54a and the outside sleeve 54b due to the lubricant V along the outer circumferential surface of the inside sleeve 54a and/or the inner circumferential surface 54b1 of the outside sleeve 54b dispersing—the so-called oil migration phenomenon—it is desirable to coat an adhesive onto the joint between both elements in the upper end surface of the sleeve 54.

An annular channel 54a2 that defines the radial gap expansion in cooperation with the annular recess 12a1 formed in the outer circumferential surface of the shaft 12a is formed in the mid portion axially of the inner circumferential surface of the through-hole 54a1 in the inside sleeve 54a. Further, an axially extending channel 64a shaped with a flat bottom-face that reaches the lower end face of the inside sleeve 54a where it opposes the upper face of the thrust plate 12b in the axial direction, is formed in the outer circumferential surface of the inside sleeve 54a; and since the inside sleeve 54a is fixedly fitted into the inner circumferential surface 54b1 of the outside sleeve 54b, a breathing hole 64 is defined between the base plane of the axial channel 64a and the inner circumferential surface of the outside sleeve 54b. The breathing hole 64 communicates with the exterior of the bearing via a radial through-hole 65 that radially penetrates the outside sleeve 54b. Further, the other end of an intermediate vent hole 59, one end of which opens on the annular channel 54a2 formed in the inside sleeve 54a, opens into the axial channel 64a, and the radial gap expansion 18 is communicated with the exterior of the bearing through the breathing hole 64 and the radial through-hole 65.

The breathing hole 64 has a rectangular plane form where it opens near the outer periphery of the thrust plate 12b; furthermore a beveled face 64a1, which gradually increases the clearance dimension of the gap between the bottom surface of the axial channel 64a heading axially upward from the lower-end face of the inside sleeve 54a and the inner circumferential surface of the outside sleeve 54b, is formed in the aperture. That is, the breathing hole 64 on the thrust plate 12b side is formed into a taper. The breathing hole 64 is formed into a taper forms and sustains a boundary surface between the air taken in through the radial through-hole 65 and the lubricant V retained surrounding the thrust plate 12b.

When the outer periphery of the thrust plate 12b during high-speed rotation of the motor comes into contact with air, a phenomenon occurs in which the air is drawn into where the top thrust bearing portion 26 is configured near the breathing hole 64, by adhesive force of the air against the surface of the thrust plate 12b. Invasion of air into interior of the top thrust bearing portion 26 causes a shortage in the lubricant V and therefore sufficient hydrodynamic pressure for bearing axial load cannot be gained. For this reason, the breathing hole 64 on the thrust plate 12b side is formed into a taper whose clearance dimension expands heading axially upward, which makes the breathing hole 64 open radially outward further than the outer circumferential edge of the thrust plate 12b, to avoid the risk of the thrust plate 12b coming into contact with air.

Figure 10:
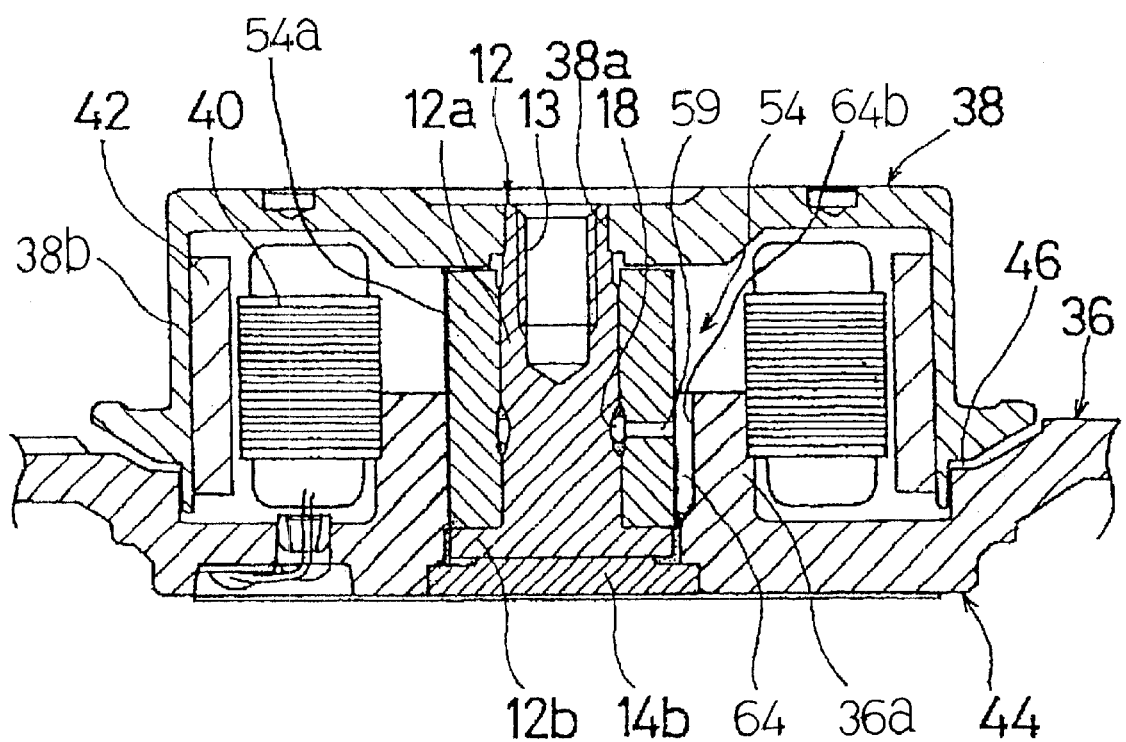
FIG. 10 is a sectional view showing an example of a modification of the FIG. 6 motor.

Herein, the dimensions of the radial gap between the outer circumferential surface of the thrust plate 12b and the inner circumferential surface 54b1 of the outside sleeve 54b, and of the breathing hole 64 on the thrust plate 12b side are made about equal in measurement—preferably from approximately 0.05 mm to approximately 0.1 mm. Further, in the above-described second embodiment of the present invention, as shown in FIG. 10, the annular cylindrical wall 36a integrally formed with the bracket 36 can be formed thicker radially than in the motor shown in FIG. 2, which renders the outside sleeve 54b unnecessary. This curtails the number of parts, and simplifies the configuration of the motor configuring the breathing hole 64 from the axial channel 64b formed in the inner circumferential surface of the cylindrical wall 36a, makes the radial through-hole 65 unnecessary, curtails the manufacturing processes, and improves the yield.

Next a third embodiment of the present invention will be explained with reference to FIGS. 11–14. It should be understood that in the following, which explains the motor and hydrodynamic pressure bearing device of the third embodiment, like marks refer to that which is identical with or equivalent to the above-described first embodiment and/ or second embodiment, and their explanation is omitted.

In the third embodiment of the present invention, the sleeve 54 that accommodates the rotary shaft member 12 likewise as in the above-described second embodiment composed of two elements, inside sleeve 54a and outside sleeve 54b.

Figure 11:
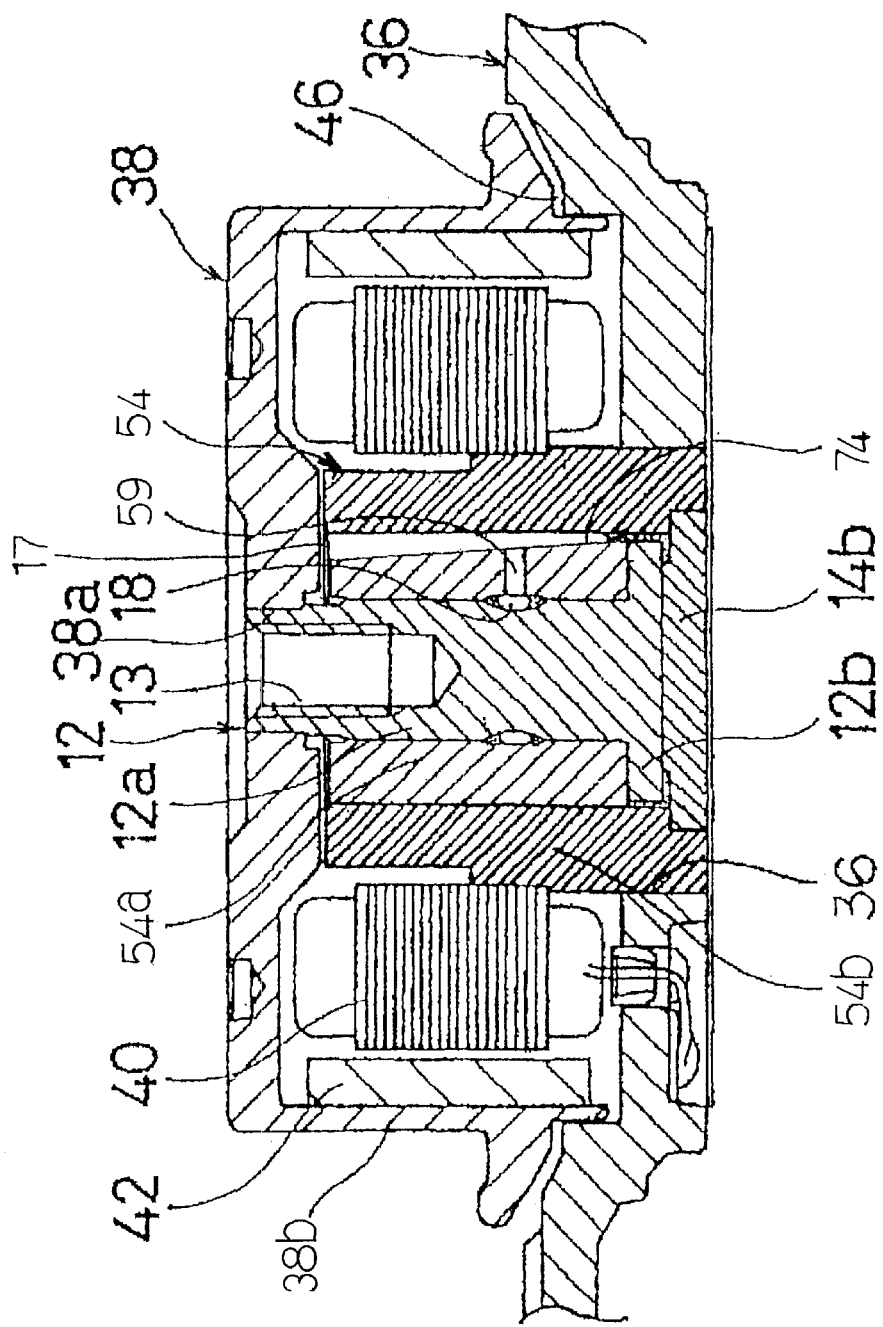
FIG. 11 is a sectional view showing a third embodiment of a motor of the present invention.
Figure 12:
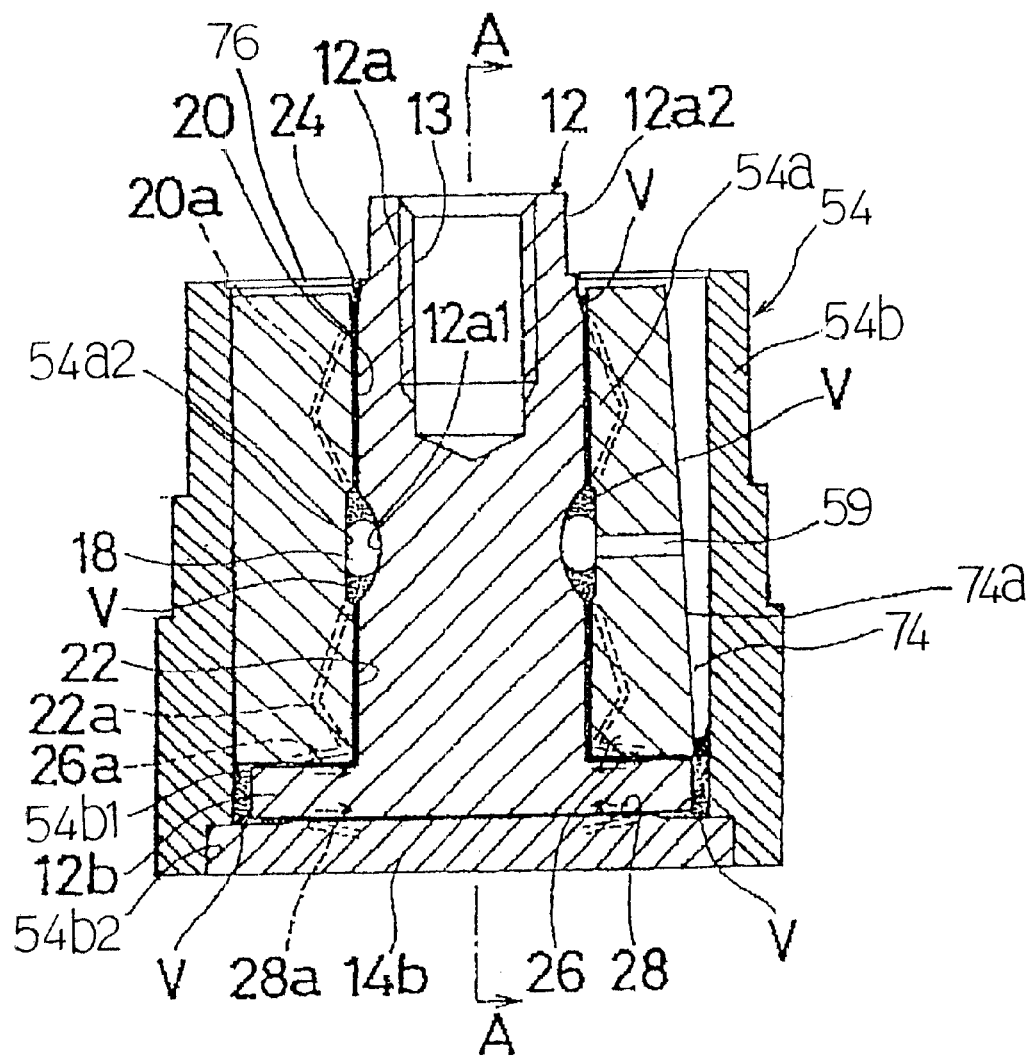
FIG. 12 is a sectional view exemplarily showing a hydrodynamic-pressure bearing device from the motor shown in FIG. 11.
Figure 13:
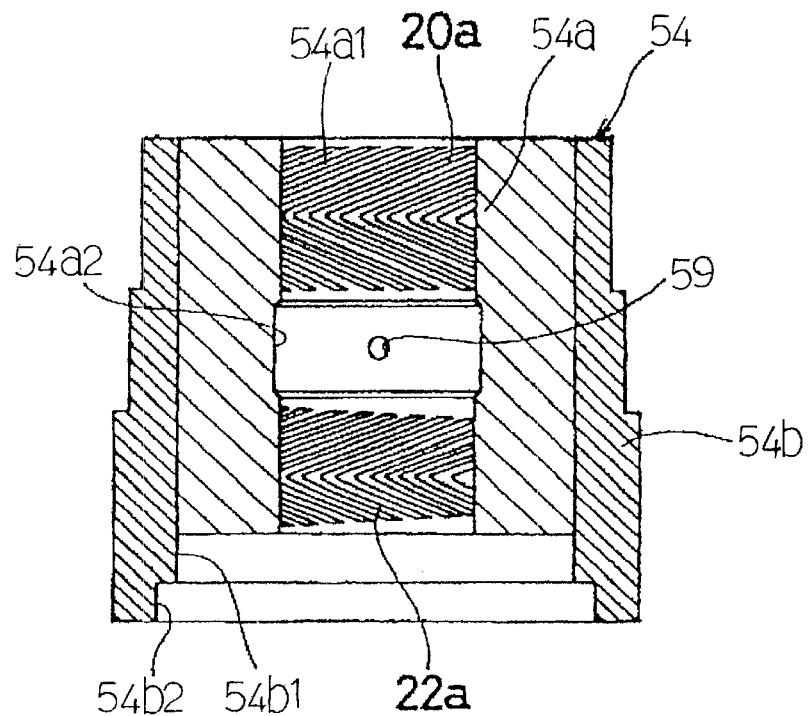
FIG. 13 is a sectional view taken along the line A—A through a sleeve element of the hydrodynamic-pressure bearing device shown in FIG. 12.
Figure 14:
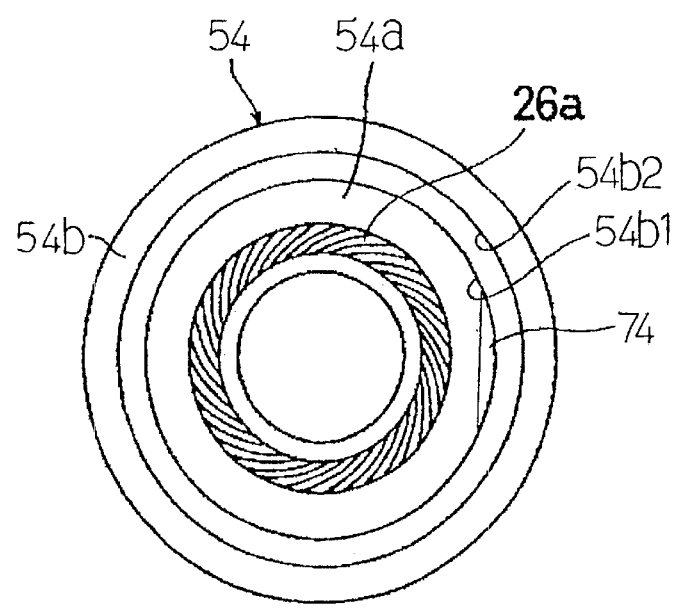
FIG. 14 is a bottom-face view of the sleeve element of the FIG. 11 motor.

As shown in FIGS. 11 and 12, in the third embodiment of the present invention a breathing hole 74 that opens the intermediate vent hole 59 communicating with the radial gap expansion 18, and the top and bottom thrust bearing portions 26 and 28 with exterior of the bearing is defined by making a portion of the outer circumferential surface of the inside sleeve 54a a planar inclined face 74a at an interval from the inner circumferential surface 54b1 of the outside sleeve 54b. The inclined face 74a is formed such that the clearance dimension of the interval with the inner circumferential surface 54b1 of the outside sleeve 54b expands heading axially upwards. Accordingly, constituting the breathing hole 74 by the portion of the outer circumferential surface of the inside sleeve 54a being the planar inclined face 74a makes the configuration of the sleeve 54 more simplified.

Also, the upper end of the outside sleeve 54b protrudes further upward than the upper end of the inside sleeve 54a. An annular plate member 76, whose bottom face axially opposes the upper end face of the inside sleeve 54a via a gap, and meanwhile whose inner circumferential surface radially opposes the outer circumferential surface of the shaft 12a via a micro-gap, is attached to the inner circumferential face of the protruding part by bonding or press-fitting. The plate member 76 is formed by a punching process by pressing a wafer metal plate or is molded from a (synthetic polymer) resin.

By setting the dimension of the radial gap between the outer circumferential surface of the shaft 12a and the inner circumferential surface of the plate member 76 as far as possible smaller than the dimension of the axial gap between the upper end face of the inside sleeve 54a and the plate member 76, during revolution a difference occurs in the flow rate of the air flow that develops in the radial gap defined between the inner circumferential surface of the plate member 76 and the outer circumferential surface of the shaft 12a, and the axial gap between the underside of the plate member 76 and the upper end face of the inside sleeve 54a. Consequently, resistance to outflow to the exterior of vapor generated by gasification of lubricant V is increased, which keeps the vapor pressure of lubricant V within the airspace defined by the sleeve 54, the rotary shaft member 12 and the plate member 76 high. Therefore evaporation of lubricant V is all the more effectively prevented, maintaining stabilized rigidity in the bearings over the long term.

Herein, the dimensions of the axial gap between the plate member 76 and the upper end face of the inside sleeve 54a is preferably made from approximately 0.2 mm to approximately 0.3 mm; furthermore, the dimension of the radial gap between the inner circumferential surface of the plate member 76 and the outer circumferential surface of the shaft 12a is made 0.05 mm or less.

Furthermore, lubricant V that has effused due to the oil migration phenomenon is replenished by the plate member 76, which prevents decrease in lubricant V owing to radially outward movement under centrifugal force during rotation of the motor that would separate it remotely from the gap between the inner circumferential surface of the plate member 76 having a part open to the exterior and the outer circumferential surface of the shaft 12a, and prevents decline in endurance (or durability) and reliability of the bearings due to the lubricant V running out early.

It should be understood that for the motors and hydrodynamic pressure bearing devices in each of the above described embodiments instances applied to spinning-shaft type spindle motors have been illustrated, but are not limited to these; and for the hydrodynamic pressure bearing devices, are applicable in stationary-shaft type spindle motors in which the shaft lower end is fixed into a motor support member such as a bracket, making a stationary shaft, and meanwhile wherein the sleeve is provided on the rotor hub side.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A hydrodynamic-pressure bearing device comprising:
   a shaft;
   a disk-shaped thrust plate projecting radially outward from one end of said shaft;
   a cylindrical sleeve surrounding said shaft, and said thrust plate circumferentially, via a micro-gap;
   lubricant retained within said micro-gap;
   a pair of radial bearing portions formed axially separated in between said shaft and said sleeve;
   a pair of thrust bearing portions formed in between said thrust plate and said sleeve;
   a gas intervention formed in between said pair of radial bearing portions; wherein
     the lubricant is retained continuously in between one of said radial bearing portions and one of said thrust bearing portions, with dynamic-pressure generating grooves patterned for generating dynamic pressure acting in mutually opposing directions being formed on the bearing portions, and
   a breathing hole formed in said sleeve so as to open to said gas intervention and to a portion opposing an outer peripheral portion of said thrust plate, and so as communicate with the exterior of the bearing.

2. The hydrodynamic-pressure bearing device set forth in claim 1, wherein:
   axially asymmetrical herringbone striations are formed as dynamic-pressure generating grooves in one of said radial bearing portions in which the lubricant is retained continuously with the one of said thrust bearing portions; and
   pump-in type spiral striations are formed as dynamic-pressure generating grooves in one of said thrust bearing portions.

3. The hydrodynamic-pressure bearing device set forth in claim 1, wherein said breathing hole is constituted by a through-hole radially penetrating said sleeve, and an axially directed hole connected to said through-hole.

4. The hydrodynamic-pressure bearing device set forth in claim 3, wherein a thrust-plate side opening of said axially directed hole is formed into a taper.

5. The hydrodynamic-pressure bearing device set forth in claim 4, wherein said thrust-plate side opening of said axially directed hole is 0.05 mm to 0.1 mm in radial dimension.

6. The hydrodynamic-pressure bearing device set forth in claim 4, wherein an annular plate member covering both an opening of said axially directed hole on a side opposite said thrust plate, and the top of said inside sleeve across a gap from the other end of said shaft outer peripherally, is fitted into said sleeve.

7. The hydrodynamic-pressure bearing device set forth in claim 6, wherein:
   dimension between said annular plate member and the upper end of said inside sleeve is 0.2 mm to 0.3 mm; and dimension between said annular plate member and the outer circumferential surface of said shaft is 0.05 mm or less.

8. The hydrodynamic-pressure bearing device set forth in claim 1, wherein said sleeve is composed of:
   a cylindrical inside sleeve opposing said shaft and said thrust plate and whereon the dynamic-pressure generating grooves are formed; and
   an outside sleeve holding said inside sleeve along its outer circumferential side.

9. The hydrodynamic-pressure bearing device set forth in claim 8, wherein said axially directed hole is defined in between a base plane of a recess formed in axial extension in an outer circumferential portion of said inside sleeve, and said outside sleeve.

10. The hydrodynamic-pressure bearing device set forth in claim 8, wherein said axially directed hole is defined in between a part of said inside sleeve formed on a portion of its outer circumferential surface parallel to said outside sleeve, and said outside sleeve.

11. For a spindle motor including a shaft and a sleeve encompassing the shaft, a hydrodynamic-pressure bearing device comprising:
   a thrust flange formed integrally on the shaft endwise, the thrust flange therein having shaft-ward and outer-end faces;
   flange-proximal and flange-distal radial bearing sections each defined by, and at a radial micro-gap between, the sleeve bore surface and the shaft cylindrical surface;
   a radial gap expansion configured annularly between the shaft and the sleeve to separate said flange-proximal and flange-distal radial bearing sections;
   an annular cavity accommodating said thrust flange, said annular cavity formed endwise in the sleeve concentric with its bore and having an outer-circumferentially recessed base, the base including a radially inward thrust-bearing face annularly paralleling the shaft-ward face of said thrust flange at an axial micro-gap therefrom to define a first thrust bearing section, wherein the axial micro-gap of said first thrust bearing section is made continuous with the radial micro-gap of said flange-proximal radial bearing section;
   a thrust cover fit concentrically endwise onto the sleeve, said thrust cover being formed with a centrally raised face paralleling the outer-end face of said thrust flange at a micro-gap therefrom to form a second thrust bearing section;
   lubricant retained in said radial and said axial micro-gaps;
   radially patterned grooves formed in said first and second thrust bearing sections for generating thrust-bearing hydrodynamic pressure rising radially inward with respect to said thrust flange;
   axially patterned grooves formed in said flange-proximal and flange-distal radial bearing sections for generating radial-bearing hydrodynamic pressure; and
   breathing holes formed in the sleeve respectively for communicating the outer-circumferentially recessed base of said annular cavity, and said radial gap expansion, with the atmosphere external to the sleeve; wherein
   the axially patterned grooves formed in said flange-proximal radial bearing section are made axially asymmetrical for hydrodynamic-pressure-generating cooperation with the radially patterned grooves formed in said first thrust bearing section, such that shaft-bearing peak pressure develops in the lubricant where said flange-proximal radial bearing section and said first thrust bearing section meet, and the peak pressure drives air bubbles caught in the lubricant into said breathing holes.

12. The hydrodynamic-pressure bearing device set forth in claim 11, wherein:
   said radially patterned grooves formed in said first and second thrust bearing sections are pump-in type spiral striations; and
   said axially patterned grooves formed in said flange-proximal and flange-distal radial bearing sections are herringbone striations.

13. The hydrodynamic-pressure bearing device set forth in claim 11, wherein said annular cavity is configured such that lubricant is retained continuously between said first and second thrust bearing sections.

* * * * *